(12) United States Patent
Kissell

(10) Patent No.: US 7,162,621 B2
(45) Date of Patent: Jan. 9, 2007

(54) VIRTUAL INSTRUCTION EXPANSION BASED ON TEMPLATE AND PARAMETER SELECTOR INFORMATION SPECIFYING SIGN-EXTENSION OR CONCENTRATION

(75) Inventor: Kevin D. Kissell, Le Bar sur Loup (FR)

(73) Assignee: MIPS Technologies, Inc., Mountain View, CA (US)

( * ) Notice: Subject to any disclaimer, the term of this patent is extended or adjusted under 35 U.S.C. 154(b) by 282 days.

(21) Appl. No.: 09/788,682

(22) Filed: Feb. 21, 2001

(65) Prior Publication Data

US 2002/0116603 A1 Aug. 22, 2002

(51) Int. Cl.
*G06F 9/30* (2006.01)

(52) U.S. Cl. .................. 712/242; 712/211; 712/243; 717/136

(58) Field of Classification Search ............... 712/211, 712/200, 243, 209, 247, 248; 717/138, 139
See application file for complete search history.

(56) References Cited

U.S. PATENT DOCUMENTS

| | | | | |
|---|---|---|---|---|
| 4,302,820 A | * | 11/1981 | Struger et al. ............... | 712/248 |
| 4,317,170 A | | 2/1982 | Wada et al. ................ | 712/224 |
| 4,396,982 A | | 8/1983 | Wada et al. ................ | 712/204 |
| 4,811,215 A | | 3/1989 | Smith | |
| 4,825,363 A | * | 4/1989 | Baumann et al. ........... | 712/211 |
| 4,860,192 A | | 8/1989 | Sachs et al. | |
| 4,884,197 A | | 11/1989 | Sachs et al. | |
| 4,899,275 A | | 2/1990 | Sachs et al. | |
| 4,924,435 A | | 5/1990 | Brunvand et al. | |
| 4,928,223 A | | 5/1990 | Dao et al. | |
| 5,136,696 A | * | 8/1992 | Beckwith et al. ........... | 712/240 |
| 5,177,701 A | * | 1/1993 | Iwasa ......................... | 712/210 |
| 5,220,656 A | * | 6/1993 | Itomitsu et al. ............. | 712/211 |
| 5,222,244 A | * | 6/1993 | Carbine et al. .............. | 712/41 |
| 5,235,686 A | * | 8/1993 | Bosshart ..................... | 712/247 |
| 5,299,147 A | | 3/1994 | Holst | |
| 5,479,620 A | * | 12/1995 | Kiyohara et al. ........... | 712/226 |
| 5,499,299 A | | 3/1996 | Takenaka et al. | |
| 5,502,829 A | | 3/1996 | Sachs | |
| 5,513,366 A | | 4/1996 | Agarwal et al. ............. | 712/22 |
| 5,537,562 A | | 7/1996 | Gallup et al. ............... | 712/234 |

(Continued)

OTHER PUBLICATIONS

Jae Wook Chung et al., *Fast Implementation of Elliptic Curve Defined over GF($P^m$) on CalmRISC with MAC2424 Coprocessor*, C.K. Koc and C. Paar (Eds.): CHES 2000, LNCS 1965, pp. 57-70, 2000.

(Continued)

*Primary Examiner*—Kenneth S. Kim
(74) *Attorney, Agent, or Firm*—Sterne, Kessler, Goldstein & Fox P.L.L.C.

(57) ABSTRACT

An extendable instruction set architecture is provided. In an embodiment, a microprocessor includes a memory, a virtual instruction expansion store, and substitution logic. The memory stores at least one virtual instruction that includes an index and at least one parameter. The virtual instruction expansion store includes at least one instruction template and at least one parameter selector. The substitution logic forms a sequence of at least one expanded instruction. In a example, the substitution logic sign-extends the at least one parameter to form an immediate value of the at least one expanded instruction in a manner specified by the at least one parameter selector. In another example, the substitution logic concatenates a first parameter and a second parameter of the virtual instruction to form an immediate value of the at least one expanded instruction in a manner specified by the at lest one parameter selector.

22 Claims, 4 Drawing Sheets

U.S. PATENT DOCUMENTS

| | | | |
|---|---|---|---|
| 5,560,028 A | 9/1996 | Sachs et al. | |
| 5,748,979 A | 5/1998 | Trimberger | |
| 5,794,003 A | 8/1998 | Sachs | |
| 5,798,923 A | 8/1998 | Laskowski | |
| 5,852,726 A | 12/1998 | Lin et al. | 712/200 |
| 5,875,336 A * | 2/1999 | Dickol et al. | 717/143 |
| 5,880,984 A | 3/1999 | Burchfiel et al. | 708/501 |
| 5,918,031 A * | 6/1999 | Morrison et al. | 712/208 |
| 5,926,642 A * | 7/1999 | Favor | 712/1 |
| 5,961,629 A | 10/1999 | Nguyen et al. | 712/23 |
| 5,996,062 A | 11/1999 | Sachs | |
| 6,009,450 A | 12/1999 | Dworkin et al. | |
| 6,035,120 A * | 3/2000 | Ravichandran | 717/141 |
| 6,035,317 A | 3/2000 | Guy | |
| 6,041,403 A * | 3/2000 | Parker et al. | 712/210 |
| 6,067,615 A | 5/2000 | Upton | |
| 6,138,229 A | 10/2000 | Kucukcakar et al. | |
| 6,141,421 A | 10/2000 | Takaragi et al. | |
| 6,154,834 A | 11/2000 | Neal et al. | |
| 6,185,668 B1 | 2/2001 | Arya | |
| 6,263,429 B1 * | 7/2001 | Siska | 712/245 |
| 6,282,635 B1 | 8/2001 | Sachs | |
| 6,292,883 B1 * | 9/2001 | Augusteijn et al. | 712/209 |
| 6,298,438 B1 | 10/2001 | Thayer et al. | 712/226 |
| 6,453,407 B1 * | 9/2002 | Lavi et al. | 712/24 |
| 6,625,726 B1 * | 9/2003 | Clark et al. | 712/245 |
| 6,651,160 B1 | 11/2003 | Hays | 712/210 |
| 6,892,293 B1 | 5/2005 | Sachs et al. | |

OTHER PUBLICATIONS

Darrel Hankerson et al., *Software Implementation of Elliptic Curve Cryptography over Binary Fields*, C.K. Koc and C. Paar (Eds.): CHES 2000, LNCS 1965, pp. 1-24, 2000.

Marc Joye et al., *Efficient Generation of Prime Numbers*, C.K. Koc and C. Paar (Eds.): CHES 2000, LNCS 1965, pp. 340-354, 2000.

Souichi Okada et al., *Implementation of Elliptic Curve Crytographic Coprocessor over $GF(2^m)$ on an FPGA*, C.K. Koc and C. Paar (Eds.): CHES 2000, LNCS 1965, pp. 25-40, 2000.

Geraldo Orlando et al., *A High-Performance Reconfigurable Elliptic Curve Processor for $GF(2^m)$*, C.K. Koc and C. Paar (Eds.): CHES 2000, LNCS 1965, pp. 41-56, 2000.

Erkay Savas et al., *A Scalable and Unified Multiplier Architecture for Finite Fields $GF(p)$ and $GF(2^m)$*, C.K. Koc and C. Paar (Eds.): CHES 2000, LNCS 1965, pp. 277-292, 2000.

Zhijie Shie et al., *Bit Permutation Instructions for Accelerating Software Cryptography*, Proceedings of the IEEE International Conference on Application-specific Systems, Architectures and Processors, Jul. 10-12, 2000, Boston, Massachusetts, USA, pp. 138-148.

*A236 Parallel Digital Signal Processor Chip Programmer's Reference Manual*, Oxford Micro-Devices, Inc., 1994, 195 pages (Bates Nos. L11184-L11378).

Bier, J., "DSP16xxx Targets Communications Apps," Microprocessor Report, MicroDesign Resources, Sep. 15, 1997, pp. 11-15.

*DSP56000 24-Bit Digital Signal Processor Family Manual*, Motorola, Inc., 1995, 638 pages (Bates Nos. L08722-L09359).

*i860™ Microprocessor Family Programmer's Reference Manaul*, Intel Corporation, 1992, 79 pages (Bates Nos. L09361-L09439).

*IEEE Standard for Binary Floating-Point Arithmetic*, IEEE, 1985, pp. i-vi and 1-14.

*TMS320C1x/C2x/C2xx/C5x Assembly Language Tools User's Guide*, Texas Instruments, Mar. 1995, 483 pages (Bates Nos. L07916-L08398).

*TMS320C5x General-Purpose Applications User's Guide*, Texas Instruments, Jul. 1997, 167 pages (Bates Nos. L08399-L08565).

*VIS⊥ Instruction Set User's Manual*, Sun Microsystems, Inc., 1997, pp. i-xii and 1-136.

Walter Hollingsworth et al., "The Clipper™ Processor: Instruction Set Architecture and Implementation," Communications of the ACM, vol. 32, No. 2, pp. 200-219, ACM, Feb. 1989.

*Fairchild CLIPPER™ 32-Bit Microprocessor User's Manual*, Prentice-Hall, Inc., Englewood Cliffs, New Jersey (1987).

*Clipper architecture: Information from Answers.com* at <http://www.answers.com/topic/clipper-architecture>, 4 pages (retrieved Jul. 25, 2006).

* cited by examiner

VIRTUAL INSTRUCTION EXPANSION BASED ON TEMPLATE AND PARAMETER SELECTOR INFORMATION SPECIFYING SIGN-EXTENSION OR CONCENTRATION

CROSS-REFERENCE TO RELATED APPLICATIONS

This application is related to the following co-pending applications, each of which is being filed concurrently with this application and is incorporated by reference: (1) U.S. application Ser. No. 09/788,683, titled "Partial Bitwise Permutations"; (2) U.S. application Ser. No. 09/788,670, titled "Binary Polynomial Multiplier"; (3) U.S. application Ser. No. 09/788,684, titled "Microprocessor Instructions For Performing Polynomial Arithmetic Operations"; and (4) U.S. application Ser. No. 09/788,685, titled "Extended-Precision Accumulation of Multiplier Output".

TECHNICAL FIELD

This invention relates to a technique for providing configurable instruction sequence generation, and more particularly to a technique for using virtual instructions to generate a sequence of instructions to be executed by a processor.

BACKGROUND

Reduced instruction set computer (RISC) architectures were developed as industry trends tended towards larger, more complex instruction sets. By simplifying instruction set designs, RISC architectures make it easier to use techniques such as pipelining and caching, thus increasing system performance. By focusing on speed and simplicity of design, rather than instruction semantics, RISC architectures often result in larger executable code size than comparable complex instruction set computer (CISC) architecture machines. For example, a task that may be represented as one complex instruction in a CISC architecture may take two or more instructions in a RISC architecture. However, the performance gains resulting from increased clock speeds and increased pipelining that may be attained with a RISC architecture usually outweigh any increase in executable code size.

RISC architectures usually have fixed-length instructions (e.g., 16-bit, 32-bit, or 64-bit), with few variations in instruction format. For example, each instruction in an instruction set architecture (ISA) may have the source registers in the same location. For example, a 32-bit ISA may have source registers specified always by bits 16–20 and 21–25. This allows the specified registers to be fetched for every instruction without requiring any complex instruction decoding.

SUMMARY

In one general aspect, an instruction set architecture includes a virtual instruction for generating a sequence of underlying machine instructions. A virtual instruction includes an opcode that identifies the instruction as a virtual instruction. The virtual instruction, having zero or more virtual parameters, is associated with a sequence of instructions.

Implementations may include a virtual instruction index within a virtual instruction code. The index may identify one virtual instruction from multiple available virtual instructions. Some implementations may provide virtual parameters, each of which includes a predetermined number of bits; or each of which includes either a first predetermined number of bits or a second predetermined number of bits. For example, one implementation may provide three-bit and five-bit virtual parameters.

Each virtual instruction is associated with a sequence of instructions to execute. Each instruction in the sequence may include an instruction template identifying an instruction to be performed, a parameter selector identifying a dynamic parameter substitution, and other control information relating to the execution of that instruction within the sequence. Implementations may include one or more of the following substitutions: a parameter field, such as a register specifier, may be replaced by a virtual parameter; an opcode field may be replaced by a virtual parameter; an immediate field may be replaced by a virtual parameter; an immediate field may be replaced with a sign-extension of a virtual parameter; and an immediate field may be replaced with sign-extended or unextended concatenations of one or more virtual parameters.

The details of one or more implementations are set forth in the accompanying drawings and the description below. Other features and advantages will be apparent from the description and drawings, and from the claims.

DETAILED DESCRIPTION

A virtual instruction is an instruction that is not executed directly by a processor. Rather, a virtual instruction causes a sequence of one or more instructions to be generated. The generated instructions then are executed by the processor. Virtual instructions may be used to provide more complex instructions in an ISA.

For example, a standard ISA may not have an operation for adding three numbers together and storing the result in a register. A particular application using the ISA may repeatedly add three numbers. The developers of a processor for the particular application may not wish to modify the processor entirely, yet significant code compaction may be obtained by providing an instruction for adding three numbers. A virtual instruction called "ADD3" that adds three numbers may be provided. Whenever the "ADD3" instruction is fetched, the system identifies the instruction as a virtual instruction and generates a corresponding sequence of instructions to add three numbers.

Virtual instructions provide a mechanism to implement a configurable instruction set architecture so that application-specific instructions or other specialized instructions may be added to an instruction set without redesigning or modifying a processor core.

Figure 1:
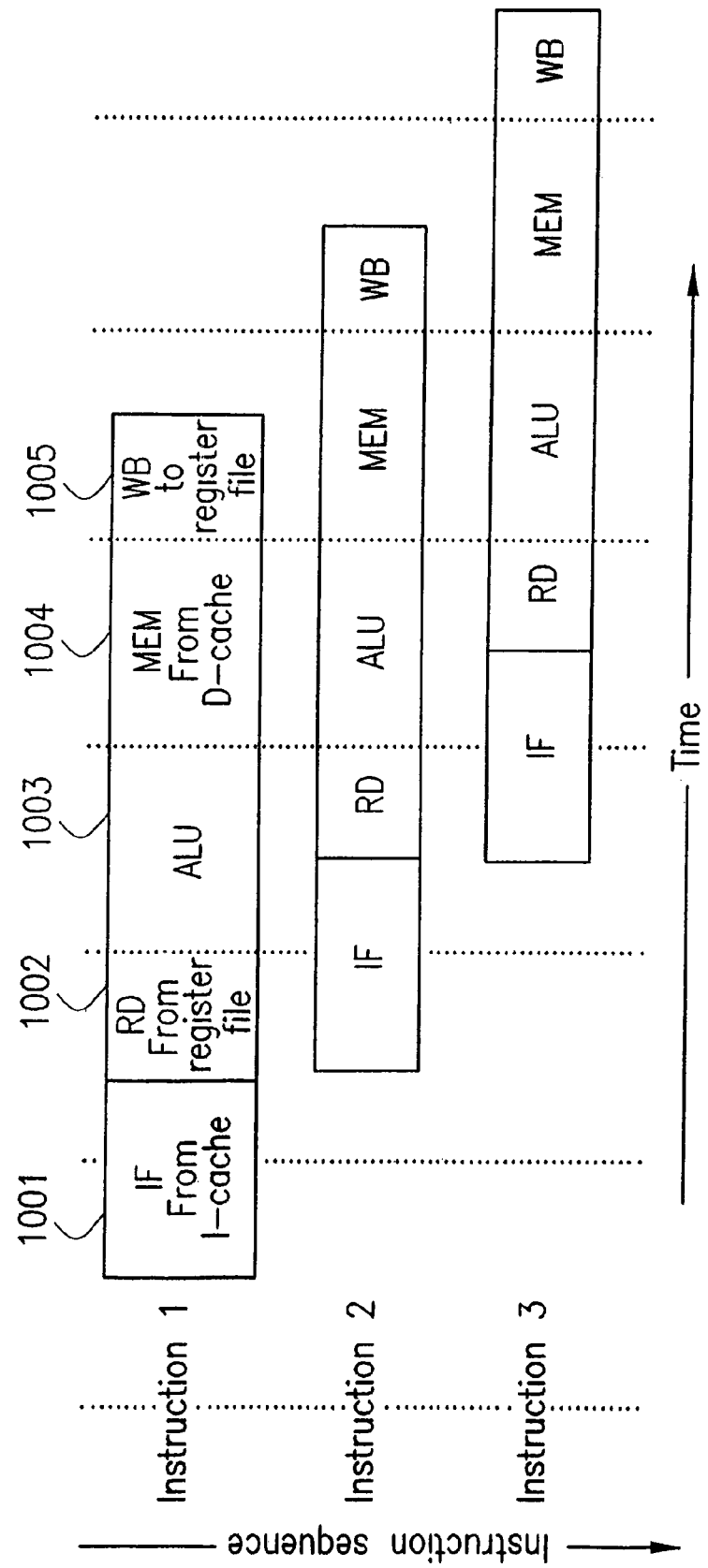
FIG. 1 is a block diagram of an exemplary five-stage pipeline that may be used in a RISC architecture.

Referring to FIG. 1, an exemplary microprocessor architecture that may be used to implement virtual instructions includes a five-stage pipeline in which each instruction is executed in a fixed amount of time, such as, for example, four clock cycles. The execution of each instruction is divided into five stages: instruction fetch (IF) stage 1001, register read (RD) stage 1002, arithmetic/logic unit (ALU) stage 1003, memory (MEM) stage 1004, and write back (WB) stage 1005. In the IF stage 1001, a specified instruction is fetched from an instruction cache. A portion of the fetched instruction is used to specify source registers that may be used in executing the instruction. In the read registers (RD) stage 1002, the system fetches the contents of the specified source registers. These fetched values may be used to perform arithmetic or logical operations in the ALU stage 1003. In the MEM stage 1004, an executing instruction may read/write memory in a data cache. Finally, in the WB stage 1005, values obtained by the execution of the instruction may be written back to a register.

Because some operations, such as floating point calculations and integer multiply/divide, cannot be performed in a single clock cycle, some instructions merely begin execution of an operation. After sufficient clock cycles have passed, another instruction may be used to retrieve a result. For example, an integer multiply instruction may take, for example, five clock cycles. One instruction may initiate the multiplication calculation, and another instruction may load the results of the multiplication into a register.

Virtual instructions help to offset costs that may be associated with the simplicity, elegance, and adherence to design principles provided by RISC architectures. Because multiple RISC instructions often are used instead of a single complex instruction, the overall size of executables is larger for RISC architectures than for others. Because computer storage is usually inexpensive, the increased storage costs are rarely a factor. However, in some applications, such as smart cards and application specific integrated circuits (ASICs), the available memory may be limited. In applications such as these, virtual instructions provide a mechanism for reducing the size of executables without significantly reducing pipeline efficiency.

Virtual instructions also offer benefits in consumer electronics, such as wireless telephones, global positioning system receivers, electronic games, and personal digital assistants, which have contributed to the growth of the embedded CPU market. Instead of building devices from commercially available, general-purpose components, manufacturers have increasingly turned to designs based on application-specific integrated circuits (ASICs). When CPU cores are embedded on chips complete with on-board caches and memory, the amount of storage space may be limited. Virtual instructions help to decrease the size of executables by adding the capability of executing complex instructions.

For example, a developer may need a compact code solution for embedded control applications. Some CISC products may include 32-bit instructions capable of setting, clearing, or testing a single bit in memory or input/output (I/O) space. While it generally may not be desirable to include such operations within a RISC processor core, virtual instructions provide a general mechanism in a RISC ISA that allows developers to add complex instructions appropriate to specific applications.

Figure 2:
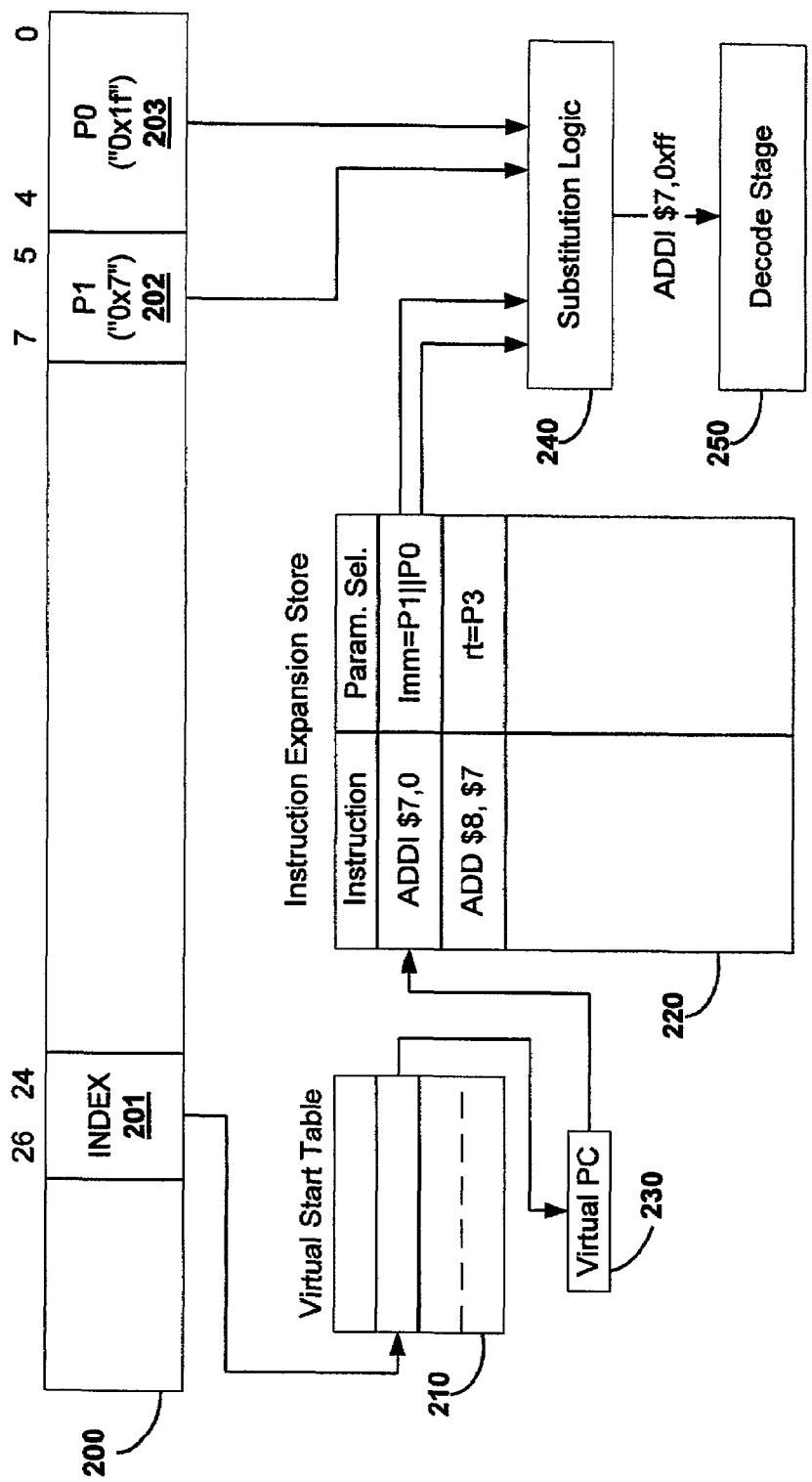
FIG. 2 is a block diagram showing parameter substitution for an exemplary configurable sequence generation instruction.

Referring to FIG. 2, a virtual instruction 200 is used to generate a sequence of instructions. In one implementation, virtual instruction 200 includes an index 201 and zero or more parameters, such as parameters 202 and 203. In this implementation, index 201 references a location within a virtual start table 210 to identify a start address for the appropriate sequence of instructions within an instruction expansion store 220.

In FIG. 2, index 201 is three bits long. Thus, eight virtual instructions may be specified in this implementation. As will be discussed more fully below, there is a tradeoff between the number of virtual instructions available and the amount of parameter information that may be encoded in a virtual instruction. Index 201 identifies an address within the virtual start table 210. Virtual start table 210 may be a data structure containing information about the locations of instructions corresponding to index 201. For example, virtual start table 210 may contain a start address within instruction expansion store 220 for each virtual instruction.

Instruction expansion store 220 may be implemented as a data structure containing one or more rows of data. Each row within the data structure may include an instruction to be executed as well as a dynamic parameter selector and other control information. For example, the exemplary instruction expansion store 220 shown in FIG. 2 includes the instruction "ADDI $7, 0" and the dynamic parameter selector "Imm=P1∥P0". The ADDI instruction adds the contents of a register and an immediate value and stores the result in an indicated register. In this example, the parameters P1 and P0 are concatenated and substituted for the immediate value within the instruction, resulting in "ADDI $7,0xff". Thus, the value "0xff" will be added to register $7. The next instruction in the sequence is "ADD $8, $7" with the parameter selector "rt=P3". The ADD instruction adds the contents of two registers and stores the result in an indicated register. In this example, substitution yields the instruction "ADD $8, $7, $9" assuming the contents of P3 is "9". Thus, the contents of registers $7 and $9 are added and stored in register $8.

A virtual program counter (PC) 230 stores the address or offset of the current instruction within the instruction expansion store 220. For example, when a virtual instruction begins execution, the start address for the corresponding instruction sequence is loaded into the virtual PC 230. As each instruction is executed, virtual PC 230 may be updated to step through the instruction expansion store 220 until the last instruction within a sequence is generated.

The last instruction within a virtual instruction expansion may be indicated in many ways. For example, information stored along with the dynamic parameter selector may be used to indicate the end of an instruction sequence. For example, if a 32-bit word is used to direct dynamic parameter substitution, one or more bits may be used to indicate that the instruction is the last within an expansion. Additionally, a new instruction may be used to indicate that the last instruction has been reached.

Substitution logic 240 is used to substitute parameters from virtual instruction 200 into instruction templates from instruction expansion store 220. The resulting instruction then may be passed on to the decode stage 250 of the processor.

Additional implementations may not use a virtual start table 210. If only a single virtual instruction is provided, or if virtual instruction expansion information is stored in a fixed or known location, then the extra level of indexing provided by virtual start table 210 may be unnecessary. In such implementations, index 201 also may not be needed, and an opcode may be sufficient to identify a particular virtual instruction and to locate the beginning of corresponding instructions within instruction expansion store 220.

Figure 3:
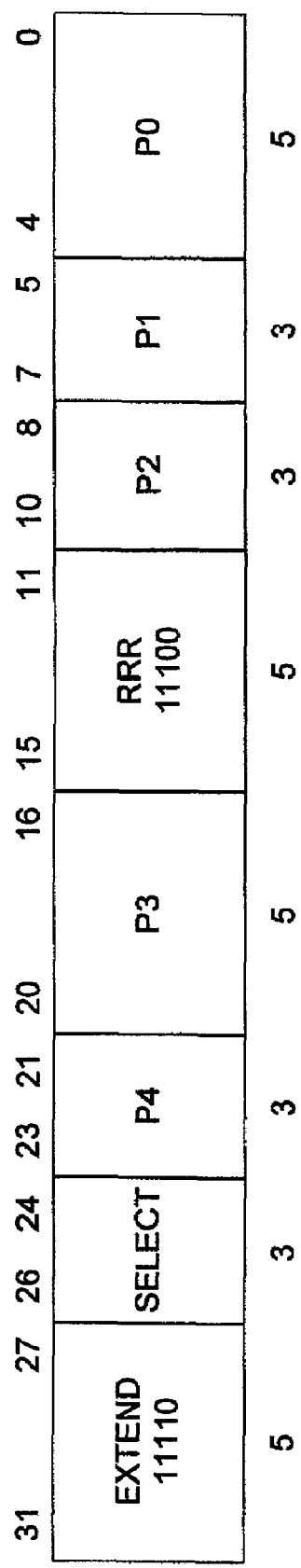
FIG. 3 is an instruction encoding for an exemplary configurable sequence generation instruction.

Referring to FIG. 3, a virtual instruction 200 may be encoded in a 32-bit instruction architecture. In this exemplary encoding, bits 11–15 and 27–31 identify the instruction as a virtual instruction. Select bits 24–26 may be used to identify one of eight virtual instructions that can be implemented. The remaining bits specify parameters used by substitution logic 240. These may be used to identify immediate values, opcodes and/or sub-opcodes, and to identify registers to be used by instructions within a virtual instruction sequence.

During execution of a virtual instruction, the virtual instruction is held in the instruction fetch stage of the pipeline, and the PC, as opposed to the virtual PC, remains fixed at the address of the virtual instruction, while the fetch logic passes a fixed sequence of instructions to the decode stage of the pipe. When the last instruction has been issued, the PC can advance. As the entire sequence takes place at the same PC, conventional branches which manipulate the PC may not take place internal to the virtual instruction sequence—though a virtual instruction sequence could conceivably terminate with a control transfer. Conditional execution within a virtual instruction may be handled in terms of conditional moves or other predicated execution mechanisms. In the simplest implementation, any exceptions taken during the execution of the virtual instruction sequence use the address of the virtual instruction as the value of the exception return address (EPC) register or error PC, and restart the virtual instruction sequence from the beginning after completion of any exception handling. For this reason, it may be desirable to use virtual instructions that are fully restartable at any point in their execution.

Additional implementations may allow branching within a virtual instruction expansion. For example, one virtual instruction implementation may provide specific instructions for branching within a virtual instruction sequence, allowing branching within the expansion of a virtual instruction. Another implementation may redefine the semantics of branch instructions so that when conventional branch instructions are encoded within a virtual instruction expansion they exhibit different behavior. Other virtual instruction branching schemes will be apparent.

In the following discussion, "VINSTR" is used as the name for application-specific virtual instructions. Generic compiler tools may assemble and disassemble the instruction by that name, but tools also may give application-specific names to various VINSTR instantiations. For example, the generic VINSTR instruction includes the parameters as shown in FIG. 3: SELECT, P0, P1, P2, P3, and P4. The SELECT parameter determines which of the possible virtual instruction sequences to execute. The remaining parameters are used as defined by instruction sequences stored in instruction expansion store 220. The exemplary encoding shown has five parameter fields, with two having five bits and three having three bits. Additional implementations may use any number of parameters and any number of bits to encode each parameter. For example, one implementation may use three parameter fields, with each parameter having five bits.

Additional implementations may encode a virtual instruction using a code to specify the virtual instruction expansion to be performed, and one or more parameters. As will be discussed below with reference to parameter selection, there is a trade-off between compactness, complexity, and flexibility of parameter substitutions.

Figure 4:
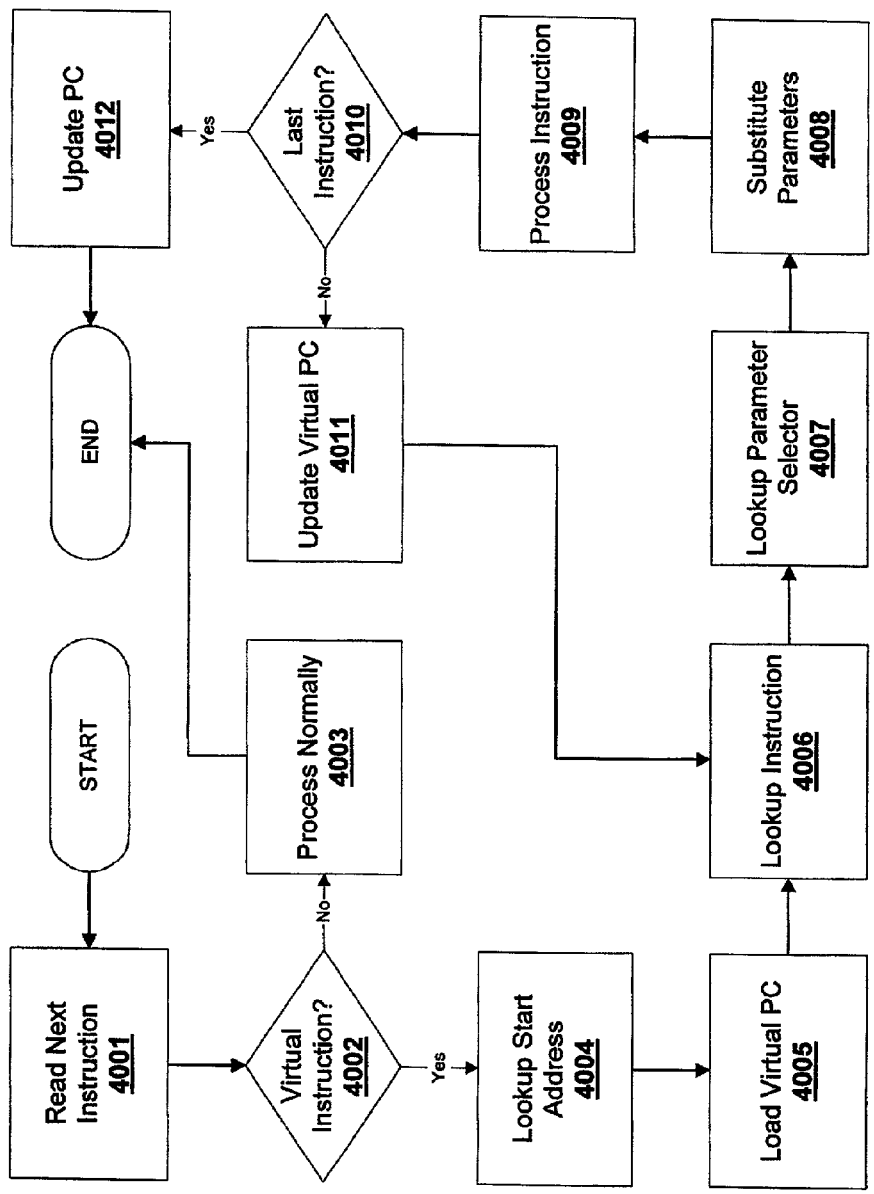
FIG. 4 is a flowchart showing a method of processing virtual instructions.

Referring to FIG. 4, virtual instructions may be processed using the structures described above with reference to FIG. 2. Initially, a processor reads the next instruction (step 4001). The processor then determines if the instruction is a virtual instruction (step 4002). If it is not, then the processor processes the instruction normally (step 4003). If the instruction is a virtual instruction, then the system determines the start address of the virtual instruction (step 4004). If more than one virtual instruction is supported, an index 201 may be used to specify a particular virtual instruction to execute. This index may be used to look up start values within virtual start table 210. This table may hold an address within instruction expansion store 220 of the first instruction to be executed. The system then loads the start address into the virtual PC (step 4005).

Next, the system uses the start address referenced by virtual PC 230 to lookup an instruction within instruction expansion store 220 (step 4006). For example, the virtual PC 230 shown in FIG. 2 references the instruction "ADDI $7, 0" within instruction store 220. The system also obtains a corresponding parameter selector (step 4007). This selector, which is discussed below, specifies which parameters from virtual instruction 200 to substitute into the current instruction. The system uses the instruction and parameter selector to perform parameter substitution (step 4008).

In some implementations, the parameter selector may support predicated execution of instructions within a virtual instruction expansion. Predicated execution may be implemented by using a parameter selector to indicate whether an instruction should be suppressed based on, for example, one or more virtual instruction parameters. In such an implementation, an instruction template, such as the "ADDI $7, 0" shown in FIG. 2, may include a corresponding parameter selector that indicates whether to suppress an instruction based on a parameter value. For example, the parameter selector may indicate to suppress the corresponding instruction based on the value of a parameter, such as P3. Instructions may be suppressed by issuing a NOP or other similar function.

The resulting instruction is returned as the result of IF stage 1001. The processor then executes this instruction (step 4009). Finally, the system determines if this was the last instruction within a virtual instruction sequence (step 4010). If there are additional instructions, the virtual PC is updated (step 4011) and the next instruction is loaded (step 4006). If there are no additional instructions, then the PC is updated (step 4012). In this implementation, the PC is not updated until the entire virtual instruction sequence is complete.

To support dynamic parameter substitution, the virtual instruction expansion store may contain more than just the sequence of 32-bit instructions to be presented to the pipeline. Additional information may be provided to indicate when, and how, parameters should be substituted for the literal content of fields within each 32-bit instruction.

Implementations may support any combination of the following dynamic parameter substitutions: (1) replacement of a parameter field with a translated or untranslated VINSTR parameter field; (2) replacement of an immediate field with a sign-extension of a VINSTR parameter field; (3) replacement of a portion of an immediate field with a VINSTR parameter field; (4) replacement of an immediate field with sign-extended or unextended concatenations of parameter fields; and/or (5) replacement of an instruction opcode or subopcode with a translated or untranslated VINSTR parameter.

One dynamic parameter substitution that may be provided is to replace a selected register field with a virtual instruction parameter. For example, an "ADD" instruction may have three parameters: "RS", "RT", and "RD". The instruction causes the contents of the register specified by RS to be added to the contents of the register specified by RT and then stored in the register specified by RD. In virtual instruction 200, two parameters are specified, one parameter 202 having 3 bits and one parameter 203 having 5 bits. One implementation provides 32 registers, each register specified by 5 bits. In this example, parameter 202 may be translated to a 5-bit register specification. For example, one translation may be to append "00" to the beginning of the three-bit value, allowing only registers 0 to 8 to be specified.

Additional translations may be used. However, it may be necessary to limit certain expansions to certain parameter fields in order to reduce the combinatorial explosion of specifier data. There is a trade off between the increase in virtual instruction size and the decrease in virtual instruction capability that results from more restricted substitution.

Another dynamic parameter substitution that may be performed is the replacement of an immediate field with a sign-extension of a VINSTR parameter field. For example, the "ADDI" instruction allows an immediate value to be added to the contents of a register. This substitution allows the immediate value field to be specified by one of the virtual instruction parameter fields. The immediate field may be 16 bits, while the virtual instruction parameter may be only five bits. However, the 5-bit value may be sign extended to 16 bits. Sign extension may not be needed if the instructions are stored initially with zeros in the immediate field.

Another dynamic parameter substitution includes the replacement of immediate fields with sign-extended or unextended concatenations of parameter fields. For example, 8-bit immediate values may be created by concatenating 3-bit and 5-bit virtual instruction parameter fields. Additionally, dynamic parameter substitution may include the replacement of an instruction opcode or sub-opcode with a translated or untranslated VINSTR parameter field. This allows, for example, one or more instructions in a virtual instruction sequence to be selected by one or more VINSTR parameters.

In addition to virtual instruction implementations using hardware, (e.g., within a microprocessor or microcontroller) implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claims.

What is claimed is:

1. A microprocessor providing an extendable instruction set architecture, the microprocessor comprising:
a memory for storing at least one virtual instruction that includes an index and at least one parameter;
a virtual instruction expansion store including at least one instruction template and at least one parameter selector; and
substitution logic that forms a sequence of at least one expanded instruction, wherein the substitution logic sign-extends the at least one parameter to form an immediate value of the at least one expanded instruction in a manner specified by the at least one parameter selector.

2. The microprocessor of claim 1, further comprising:
a virtual start table coupled to the virtual instruction expansion store.

3. The microprocessor of claim 2, further comprising:
a virtual program counter coupled between the virtual start table and the virtual instruction expansion store.

4. The microprocessor of claim 1, wherein the virtual instruction includes a first parameter having a first number of bits and a second parameter having a second number of bits.

5. The microprocessor of claim 4, wherein the first parameter includes at least three bits.

6. The microprocessor of claim 5, wherein the second parameter includes at least five bits.

7. A method for generating a sequence of at least one expanded instruction from a virtual instruction, the method comprising:
receiving a virtual instruction that includes an index and at least one parameter;
identifying an instruction template and a parameter selector based on the index; and
sign-extending the at least one parameter of the virtual instruction to form an immediate value of the at least one expanded instruction in a manner specified by the at least one parameter selector.

8. The method of claim 7, wherein the receiving step comprises receiving a virtual instruction including a first parameter having a first number of bits and a second parameter having a second number of bits.

9. The method of claim 8, wherein the receiving step comprises receiving a virtual instruction including a first parameter having at least three bits and a second parameter having at least five bits.

10. A computer-readable medium comprising a microprocessor embodied in software, the microprocessor including:
a memory for storing at least one virtual instruction that includes an index and at least one parameter;
a virtual instruction expansion store including at least one instruction template and at least one parameter selector; and
substitution logic that forms a sequence of at least one expanded instruction, wherein the substitution logic sign-extends the at least one parameter to form an immediate value of the at least one expanded instruction in a manner specified by the at least one parameter selector.

11. The computer readable medium of claim 10, wherein the microprocessor is embodied in hardware description language software.

12. The computer readable medium of claim 11, wherein the microprocessor is embodied in one of Verilog hardware description language software and VHDL hardware description language software.

13. The computer-readable medium of claim 10, wherein the virtual instruction includes a first parameter having a first number of bits and a second parameter having a second number of bits.

14. The computer-readable medium of claim 13, wherein the first parameter has at least three bits and the second parameter has at least five bits.

15. A microprocessor providing an extendable instruction set architecture, the microprocessor comprising:
- a memory for storing at least one virtual instruction that includes an index and at least one parameter;
- a virtual instruction expansion store including at least one instruction template and at least one parameter selector; and
- substitution logic that forms a sequence of at least one expanded instruction, wherein the substitution logic concatenates a first parameter and a second parameter of the virtual instruction to form an immediate value of the at least one expanded instruction in a manner specified by the at least one parameter selector.

16. The microprocessor of claim 15, further comprising:
- a virtual start table coupled to the virtual instruction expansion store.

17. The microprocessor of claim 16, further comprising:
- a virtual program counter coupled between the virtual start table and the virtual instruction expansion store.

18. The microprocessor of claim 15, wherein the virtual instruction includes a first parameter having a first number of bits and a second parameter having a second number of bits.

19. The microprocessor of claim 18, wherein the first parameter includes at least three bits.

20. The microprocessor of claim 19, wherein the second parameter includes at least five bits.

21. A method for generating a sequence of at least one expanded instruction from a virtual instruction, the method comprising:
- receiving a virtual instruction that includes an index, a first parameter, and a second parameter;
- identifying an instruction template and a parameter selector based on the index; and
- concatenating the first parameter and the second parameter of the virtual instruction to form an immediate value of the at least one expanded instruction in a manner specified by the at least one parameter selector.

22. The method of claim 21, wherein the receiving step comprises receiving a virtual instruction including a first parameter having at least three bits and a second parameter having at least five bits.

* * * * *

UNITED STATES PATENT AND TRADEMARK OFFICE
CERTIFICATE OF CORRECTION

PATENT NO. : 7,162,621 B2 Page 1 of 1
APPLICATION NO. : 09/788682
DATED : January 9, 2007
INVENTOR(S) : Kevin D. Kissell It is certified that error appears in the above-identified patent and that said Letters Patent is hereby corrected as shown below:

Title Page
In item (54), "CONCENTRATION" is replaced with --CONCATENATION--.

Title Page
In item (57), "In a example, the substitution logic" is replaced with --In an example, the substitution logic--.

Column 1
In line 4, "CONCENTRATION" is replaced with --CONCATENATION--.

Signed and Sealed this

Twenty-third Day of October, 2007

JON W. DUDAS
*Director of the United States Patent and Trademark Office*